(12) United States Patent
Madan et al.

(10) Patent No.: US 12,536,191 B2
(45) Date of Patent: Jan. 27, 2026

(54) COMPATIBILITY CHECKER FOR LISTING AUTO FULFILLMENT

(71) Applicant: Snowflake Inc., Bozeman, MT (US)

(72) Inventors: Hitesh Madan, Seattle, WA (US); Chieh-Sheng Wang, San Mateo, CA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 27 days.

(21) Appl. No.: 18/301,490

(22) Filed: Apr. 17, 2023

(65) Prior Publication Data
US 2024/0346038 A1    Oct. 17, 2024

(51) Int. Cl.
*G06F 16/27*   (2019.01)
*G06F 16/23*   (2019.01)

(52) U.S. Cl.
CPC .......... *G06F 16/27* (2019.01); *G06F 16/2365* (2019.01)

(58) Field of Classification Search
CPC .............................. G06F 16/27; G06F 16/2365
See application file for complete search history.

(56) References Cited

U.S. PATENT DOCUMENTS 11,163,798 B1 *  11/2021  Chu ................... G06F 16/1844
11,216,581 B1 *   1/2022  Arikapudi .......... G06F 21/6227
2020/0125582 A1 *  4/2020  O'Shaughnessy .... G06F 16/245

* cited by examiner

*Primary Examiner* — Khanh B Pham
*Assistant Examiner* — Samuel C Sharpless, III
(74) *Attorney, Agent, or Firm* — Schwegman Lundberg & Woessner, P.A.

(57) ABSTRACT

Provided herein are systems and methods for compatibility verification for listing auto-fulfillment. A system includes at least one hardware processor coupled to a memory and configured to decode a request for replication of data from a primary deployment account of a data provider to an account of a data consumer. A share object is retrieved in response to the request. The share object specifies a first plurality of data objects associated with the data. A determination is performed of the compatibility of each data object of the first plurality of data objects with the replication. A notification of the compatibility of each data object of the first plurality of data objects is output to the primary deployment account of the data provider.

30 Claims, 12 Drawing Sheets

COMPATIBILITY CHECKER FOR LISTING AUTO FULFILLMENT

TECHNICAL FIELD

Embodiments of the disclosure relate generally to data platforms, data providers, data consumers, automated fulfillment, multiple deployments, primary deployments, remote deployments, replication, and, more particularly, to systems and methods for configuring a compatibility checker for listing auto fulfillment.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed.

Cloud-based data warehouses and other cloud database systems or data platforms can be used in connection with data replication tasks. However, such data replication tasks can be susceptible to different types of failures which can be detected after replication has started, causing a negative impact on the user experience.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
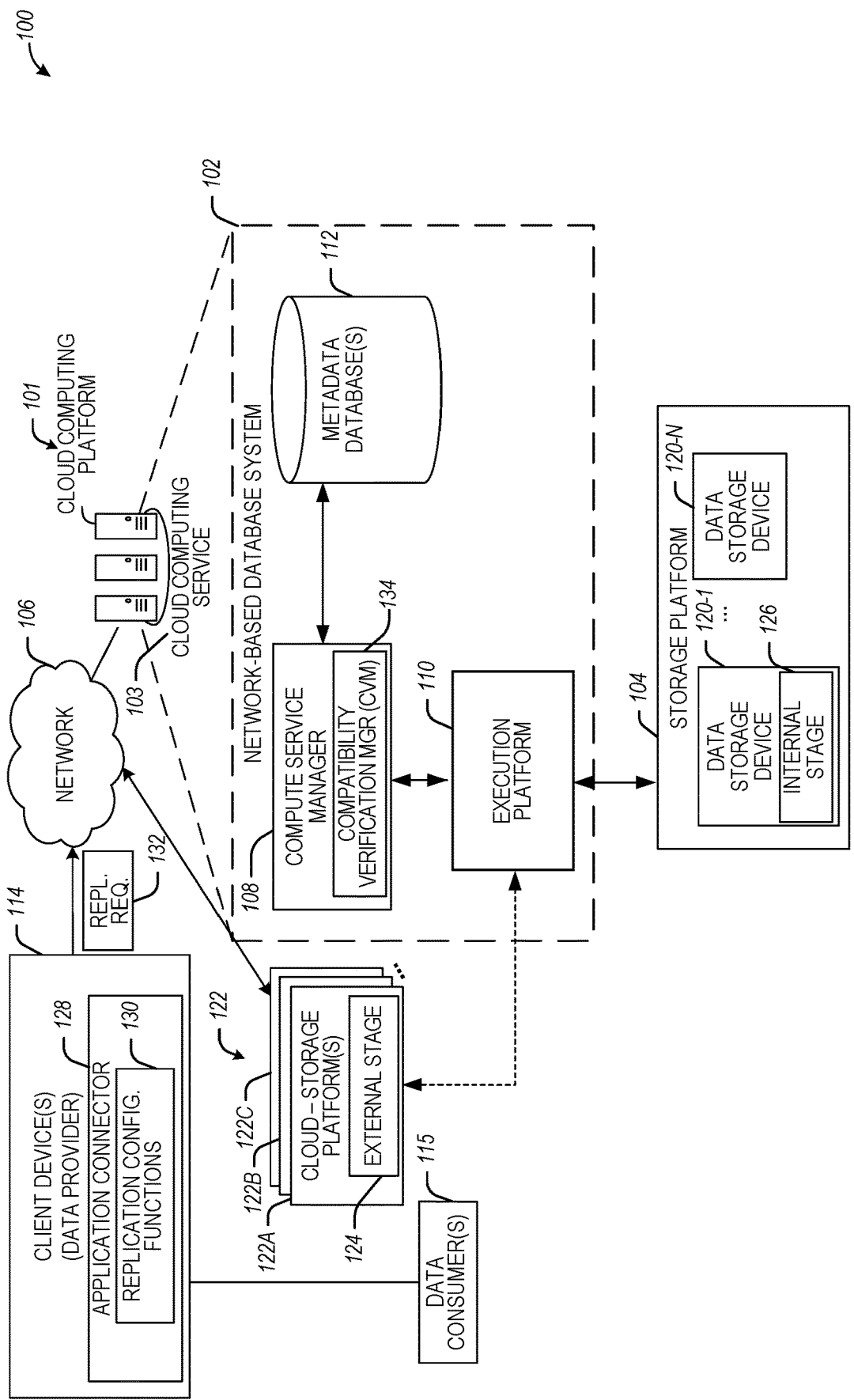
FIG. 1 illustrates an example computing environment that includes a network-based database system in communication with a cloud storage platform, according to some example embodiments.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, tags, stages, pipes, network policies, and/or the like). Furthermore, a given object such as a database may itself contain one or more objects such as schemas, tables, views, functions, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

As used herein, a tag object (or a tag) indicates a schema-level object that can be assigned to another object. A tag can be assigned an arbitrary string value upon assigning the tag to an object. Tags enable data stewards to track sensitive data for compliance, discovery, protection, and resource usage use cases through either a centralized or decentralized data governance management approach.

As used herein, a roles object configures privileges for the users to access at least one target account. For example, a certain role is given access to a certain number of objects or operations (e.g., a role has a certain number of privileges), and a user can be assigned a role.

Figure 3:
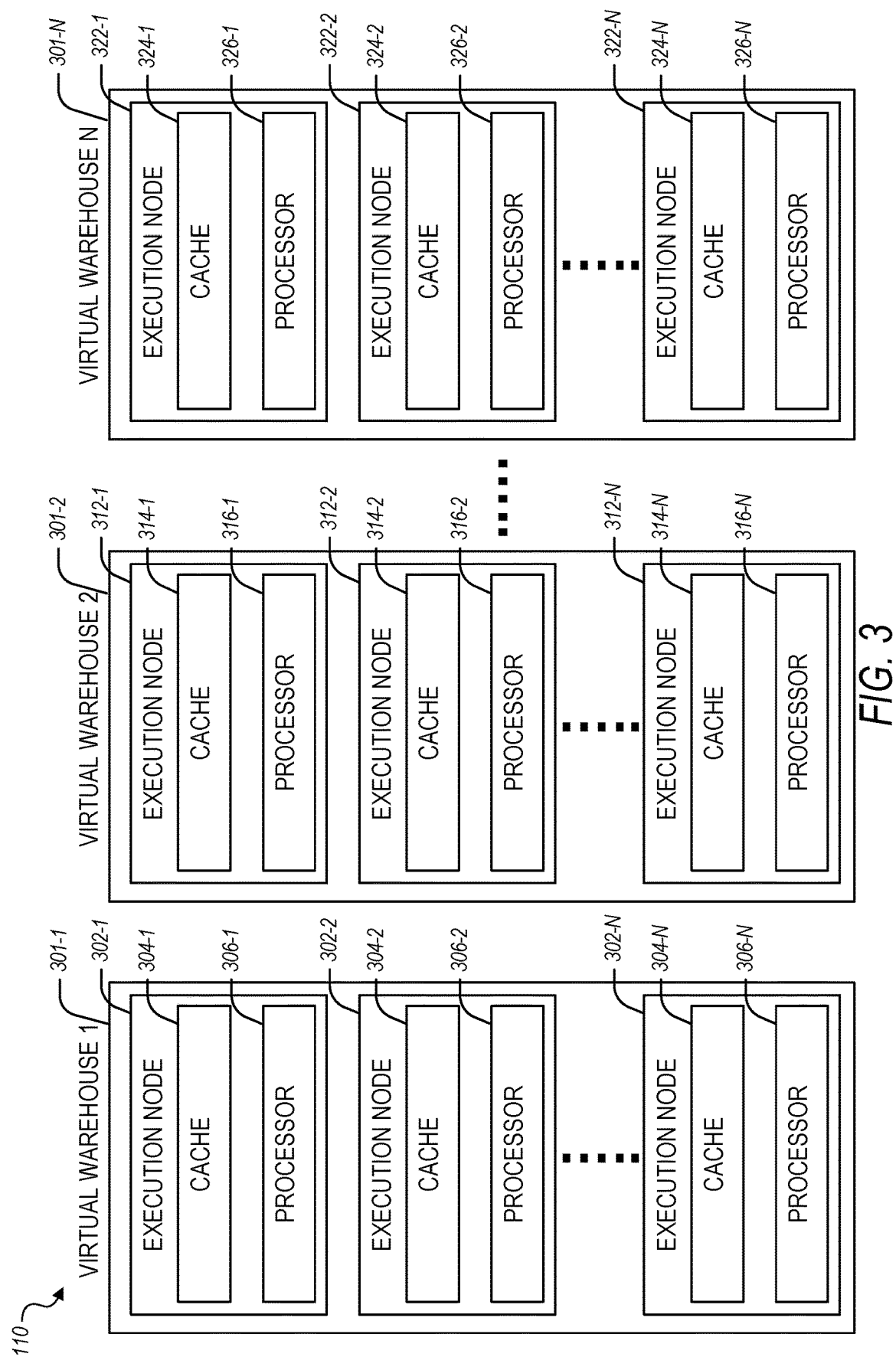
FIG. 3 is a block diagram illustrating components of an execution platform, according to some example embodiments.

A warehouse object indicates compute resources for executing the workload associated with one or more databases of a data provider. The warehouse object can indicate compute resources associated with one or more virtual warehouses (e.g., as illustrated in FIG. 3).

A resource monitor object configures monitoring the usage of compute resources used for executing the workload. For example, a resource monitor object can be used to monitor the usage of a virtual warehouse and generate a notification if such usage is above a threshold.

Some data-platform implementations include not only a first (e.g., primary, initial, etc.) deployment but also include one or more additional deployments around the globe and perhaps beyond. In the present disclosure, that first deployment is generally referred to as the "primary deployment" of the data platform, and each of the additional deployments is generally referred to herein as being a "remote deployment." These terms are used mainly to distinguish the deployments from one another, and some data platforms may use different terminology and/or have different interrelationships among multiple deployments. In some instances, a data platform may delineate a country, the world, etc. into several regions. In some arrangements, one of the regions includes the primary deployment and may also include one or more remote deployments. Additionally, each of the other regions may include one or more remote deployments.

Moreover, it is often the case that data providers are direct customers of a data platform. As an example, data providers may provide one or more types of data such as financial data (e.g., stock prices), weather data, pandemic test results, vaccination levels, and/or the like. These data providers typically have one or more customers of their own that consume the data; these entities are referred to in the present disclosure as "data consumers." One example of a data consumer might be a trading house that consumes financial data from a data provider.

It is recognized that nothing is stopping a data consumer from also (or instead) being a direct customer of a data platform, and nothing to stop data providers from also acting as data consumers concerning certain data, but for clarity of presentation, the arrangements that form the backdrop for most of the examples that are described herein stick to the hierarchy of a data platform serving one or more data providers, and each of those data providers serving one or more data consumers.

It may occur from time to time that a data consumer requests a data provider that the data provider instantiate a synced replica of one or more databases in a place that is geographically and/or network-topologically closer to the data consumer than the instantiation of that particular data that the data consumer was previously using. In other cases, a data provider may take on a new data consumer as a customer where part of the arrangement is that the data consumer is requesting that the data provider instantiate a remote deployment of a given database. It is further noted that, although there certainly could be many examples in which a given remote deployment involves multiple databases, one-database examples are primarily described in the present disclosure for simplicity.

Currently, data providers handle requests for remote deployments from their data-consumer customers in several different ways. One approach is to essentially do nothing, wait to receive such a request from a data consumer, and then manually check for data incompatibility issues, set up the related resources in the remote location, perhaps with assistance from personnel at the data platform as well. In some cases, the data platform may already have an instantiation there, in which case they may be able to just make that instantiation available to the requesting data consumer by way of the relevant data provider. There are many times, however, when the particular data platform does not have a current instantiation of the relevant database in the requested location. Requests for remote deployments may initiate with data consumers or data providers and may be communicated to a given data platform by either.

In this wait-and-then-act approach, the data provider would then typically manually configure a remote instance of the relevant database in the requested region, check for data incompatibility issues, and set up supplementary resources such as one or more accounts, one or more shares, one or more tasks and/or other processes for refreshing the data, and the like. In some aspects, the manual configuration by the data provider can also include verifying the compatibility of data objects that have been requested for replication by a data consumer. More specifically, the data provider can manually verify that each of the data objects is safe to be replicated and that replication of the data object will not cause any failures. Such a process can be time-consuming and inefficient.

Another approach that is used in some current implementations could be characterized as an act-instead-of-waiting approach in which a data platform may attempt to anticipate such requests in connection with various regions and set up fully syncing database instances and all of the supporting objects even before any data-consumer has ever asked for such data to be available in a given region. This approach is costly in terms of time and effort, and also directly monetarily costly due to charges such as data-storage charges, data-egress charges, and the like.

Thus, among other shortcomings, the wait-and-then-(re) act approach causes a delay between the time that the data consumer makes the request (and/or the time when their data provider relays that request to the data platform) and the time that the data platform completes the manual process described above—it is a request-and-then-wait situation for the data consumer. Not only does this take time, but it is also prone to human error. Moreover, many data providers may view this manual replication as not only expensive but also potentially somewhat confusing and perhaps even a bit intimidating. On the other hand, there are not many data providers that are in a hurry to start paying data-storage charges, data-egress charges, and/or the like in a situation in which they have yet to even receive a request indicating that a data consumer wants that data to be available there. Furthermore, all other things being equal, data providers typically prefer to not have data sitting out in remote deployments if there is no current business reason for that data to be there. It is a security risk in addition to also being expensive. Data providers for the most part prefer to have data only where they need it, and only while they need it there.

To address these and other issues with and shortcomings of prior implementations, disclosed herein are various embodiments of systems and methods for database replication to a remote deployment with automated fulfillment. As used herein, "fulfillment" is a term that generally relates to performing one or more tasks as requested by, for example, a data-consumer customer of a data provider, which in various embodiments is a direct customer of a data platform, as described above. A specific though non-limiting example of fulfillment in the context of the present disclosure is achieving what a data-consumer customer requests concerning database replication in remote deployments of the data platform. More generally, fulfillment may be defined as getting data where it needs to be when it needs to be there. In some embodiments, a data provider can configure data in a listing of a data exchange, which listing can be enabled for automatic fulfillment (or sharing) with a data consumer. In some embodiments, the disclosed techniques can be used in a database system (e.g., by the account of the data provider) to perform compatibility verification of a plurality of data objects associated with a share (e.g., a share object associated with data objects that have been requested for replication to an account of a data consumer based on a received replication request).

In some embodiments, a data provider can configure a listing (e.g., in a data exchange) indicating data that can be shared with a data consumer (e.g., data that can be auto-fulfilled upon receiving a replication request from a data consumer). When auto-fulfillment is configured on the listing, it may be difficult or impossible to determine whether the underlying data will cause failure due to incompatibilities such as unreplicable objects or certain missing cross-database dependencies during the actual execution/replication phase. When a data provider sets up listing auto-fulfillment (LAF), there are basic validations on the listing share, which means that many failures due to incompatibility can only be caught at a later stage. This can have a negative impact on the user experience since the data provider will expect the feature to work once the setup is completed. In some cases, the replication can fail partially and silently, which can cause the share to be broken or create unexpected results. Some existing techniques to handle listing incompatibilities include troubleshooting the incompatibilities after a data consumer requests a listing and the auto-fulfillment feature tries to execute the fulfillment. Such existing techniques are time-consuming and cause processing inefficiencies both for the data provider and the data consumer.

As used herein, the term "incompatibility" or "data incompatibility" refers to potential compatibility issues related to data objects associated with a share. For example, a share (also referred to as a share object) is compatible with listing auto-fulfillment (LAF) when data objects in the share will not fail the replication by itself (e.g., an object can be replicated or skipped), any referenced tags or policies have to reside in the same database associated with the share, and each directly or indirectly shared object is in the database associated with the share. Further definition of compatibility in connection with the disclosed compatibility verification techniques is provided herein below.

The disclosed techniques can be used to configure a compatibility verification manager (CVM) to define the patterns of incompatibility that could happen for auto-fulfillment execution before the auto-fulfillment takes place. For example, the CVM can include visitor-based checkers (e.g., a dependency verification manager (DVM) and a non-shared object verification manager (NOVM)) which can be used to inspect the underlying data of a listing (e.g., a plurality of data objects associated with a share), record all the incompatibility patterns found, and report the result before initiating the auto-fulfillment. In this regard, if a listing contains some objects that are not compatible with replication/auto-fulfillment, the data provider can be notified and instructed to fix the issue when auto-fulfillment is set up and not yet initiated.

While embodiments of the present disclosure are described in further detail below in connection with the various figures, it is briefly explained here that at least some embodiments involve verifying a plurality of objects associated with a share are compatible with replications, and provisioning a remote account of a data provider—a type of account that is referred to herein at times as a "remote-deployment account," a "remote-deployment account of a data provider," a "data-provider remote account," and the like—with the plurality of objects associated with the share. In some embodiments, replication preparation objects can be provisioned first and can be used for completing the auto-fulfillment of the plurality of objects associated with the share. Some examples of such replication preparation objects include those that are referred to herein as a shell database, a shell share (including the plurality of objects associated with the share and configured for auto-fulfillment), and a set of one or more tasks or task objects. Furthermore, in at least one embodiment, the remote-deployment account—of a data provider at the remote deployment of the data platform—is a limited-privileges account in that it is used and useful only for database and share replication and refreshing in accordance with embodiments of the present disclosure.

As mentioned above, in at least one embodiment, a set of one or more tasks—one task is used here by way of example—is installed in the data-provider remote account to perform several functions. One such function is to periodically check whether a request for replication of the database—that corresponds to the shell database and shell share—has been received at the data-provider remote account from a data-consumer customer of that data provider. If so, the task is further configured to initiate what is referred to herein as "refresh" commands concerning both the shell database and the shell share. In at least one embodiment, the invoking of these commands causes syncing to begin between the primary instance of the database in the data provider's account in the primary deployment of the data platform. That account is referred to herein at times as the "data-provider primary account," and by other names like that described above concerning remote-deployment accounts.

As a result of the invoking of a refresh command, what were a shell database and a shell share are now a populated and functioning database and an operating share in the data-provider remote account at the remote deployment. The data provider can then "share the share" with their data-consumer customer, which in at least one embodiment enables that data-consumer customer to then access the remote-deployment instance of the database. Shares are described more fully throughout the present disclosure, but briefly, in at least one embodiment, a share is an object that contains a pointer to a database; the share can be thought of as a wrapper or a container around the database. A share itself can be populated with multiple objects, and the share can be shared with various users, which grants those users access to those objects until a terminating event occurs such as the data-consumer customer dropping the share, the data provider revoking the share (concerning that customer), and/or the like.

It is also noted here that the terms "replication" and "refresh" (and similar forms such as "replicating," "refreshing," etc.) are used throughout the present disclosure. Generally speaking, "refresh" and its various forms are used to refer to a command or instruction that causes a shell database and shell share to start receiving one-way syncing (e.g., "pushed" updates). The term "replicate" and its various forms are used in a few different ways. In some cases, the "replicate" terms are used as a precursor to the "refresh" terms, where the "replicate" terms refer to the preparatory provisioning (populating, storing, etc.) of the above-described shell-type objects (e.g., shell database, shell share, etc.), in some cases along with one or task objects as described herein. When used in that manner, the "replicate" terms can be analogized to putting up scaffolding for a building, and the "refresh" terms can be analogized to putting up the building.

The "replicate" terms are also used in another way herein—in those cases, the terms are used as a general label for what a data consumer may request (e.g., via their data provider) when the data consumer wishes to have made available to them a local instance of a given database at a given remote-deployment account of their data provider; that is, the data consumer may request "replication" of a given database to a given remote deployment, and a data platform may responsively perform operations such as the more technical "replicate" operations (putting up the scaffolding) and "refresh" operations (building, populating, filling in, etc.) that are also described herein.

The various embodiments that are described herein are described with reference where appropriate to one or more of the various figures. An example computing environment including a compatibility verification manager (CVM) configured to perform visitor-based compatibility verification is discussed in connection with FIGS. 1-3. A more detailed description of the CVM is provided in connection with FIG. 5, FIG. 6, and FIG. 7. Example multi-deployment arrangements using a CVM are discussed in connection with FIG. 4, FIG. 8, FIG. 9, and FIG. 10. Example method for compatibility verification is discussed in connection with FIG. 11. A more detailed discussion of example computing devices that may be used with the disclosed techniques is provided in connection with FIG. 12.

FIG. 1 illustrates an example computing environment 100 that includes a database system in the example form of a network-based database system 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some embodiments, the client device 114 is configured with an application connector 128, which may be configured to perform replication configuration functions 130. For example, client device 114 can be associated with a data provider using the cloud computing service 103 of the network-based database system 102. In some embodiments, replication configuration functions 130 include configuring one or more listings of data published by the data provider in a data exchange. A data consumer 115 can generate a replication request 132 for the one or more listings. Such replication request 132 can be communicated directly from data consumer 115 to the network-based database system 102 via network 106. In some embodiments, the replication request 132 is initially communicated to the client device 114 of the data provider, and client device 114 forwards such request to the network-based database system 102 via the network 106. For example, replication request 132 can be communicated to the compatibility verification manager (CVM) 134 of the compute service manager 108.

The replication request 132 can indicate a request for one or more share objects associated with a listing of the data provider. The CVM 134 is configured to perform compatibility verification of a plurality of objects associated with the share object indicated in the replication request 132. After verification completes (e.g., without detecting that at least one of the plurality of data objects of the share is compatible with replication and replication of such object will not fail), CVM 134 can generate a notification to the data provider that replication (or auto-fulfillment) will proceed. If CVM 134 detects a potential failure of at least one of the data objects, a corresponding notification is communicated to the client device 114 of the data provider so that the data provider can adjust the share (e.g., adjust dependencies or correct other compatibility issues causing the detected replication failure).

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a share object associated with a listing of the data provider).

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122A, 122B, . . . , 122C (collectively, cloud storage platforms 122). The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the compute service manager 108 includes a CVM 134. The CVM 134 comprises suitable circuitry, interfaces, logic, and/or code and is configured to perform the disclosed functionalities associated with visitor-based compatibility verification of a plurality of data objects associated with a share. Additional functionalities associated with the CVM 134 are discussed in connection with FIG. 4-FIG. 11.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
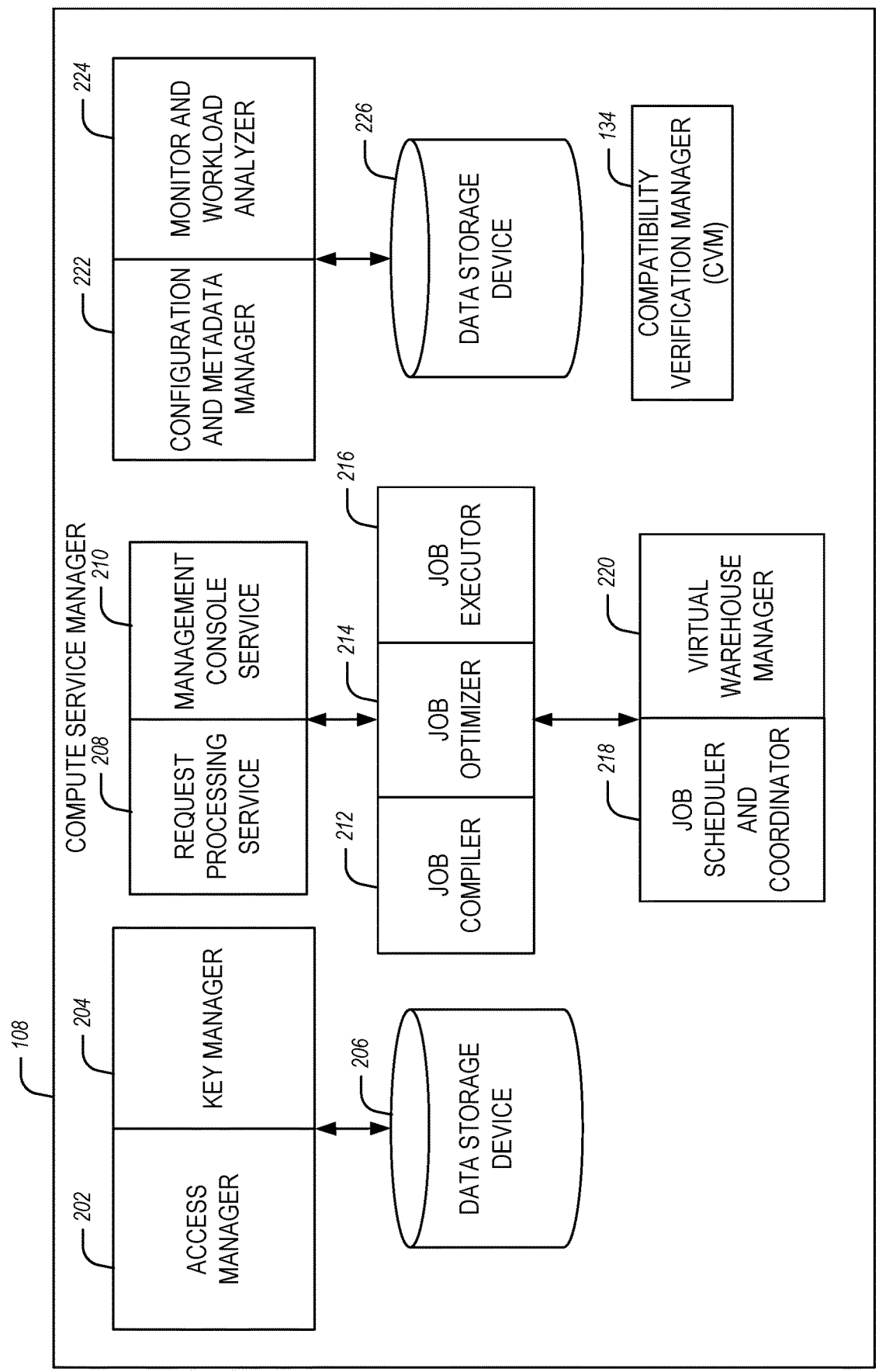
FIG. 2 is a block diagram illustrating the components of a compute service manager, according to some example embodiments.

FIG. 2 is a block diagram illustrating components of the compute service manager 108, according to some example embodiments. As shown in FIG. 2, the compute service manager 108 includes an access manager 202 and a key manager 204 coupled to an access metadata database 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As previously mentioned, the compute service manager 108 includes the CVM 134 configured to perform the disclosed compatibility verification functionalities associated with the auto-fulfillment of a listing of the data provider.

FIG. 3 is a block diagram illustrating components of the execution platform 110, according to some example embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
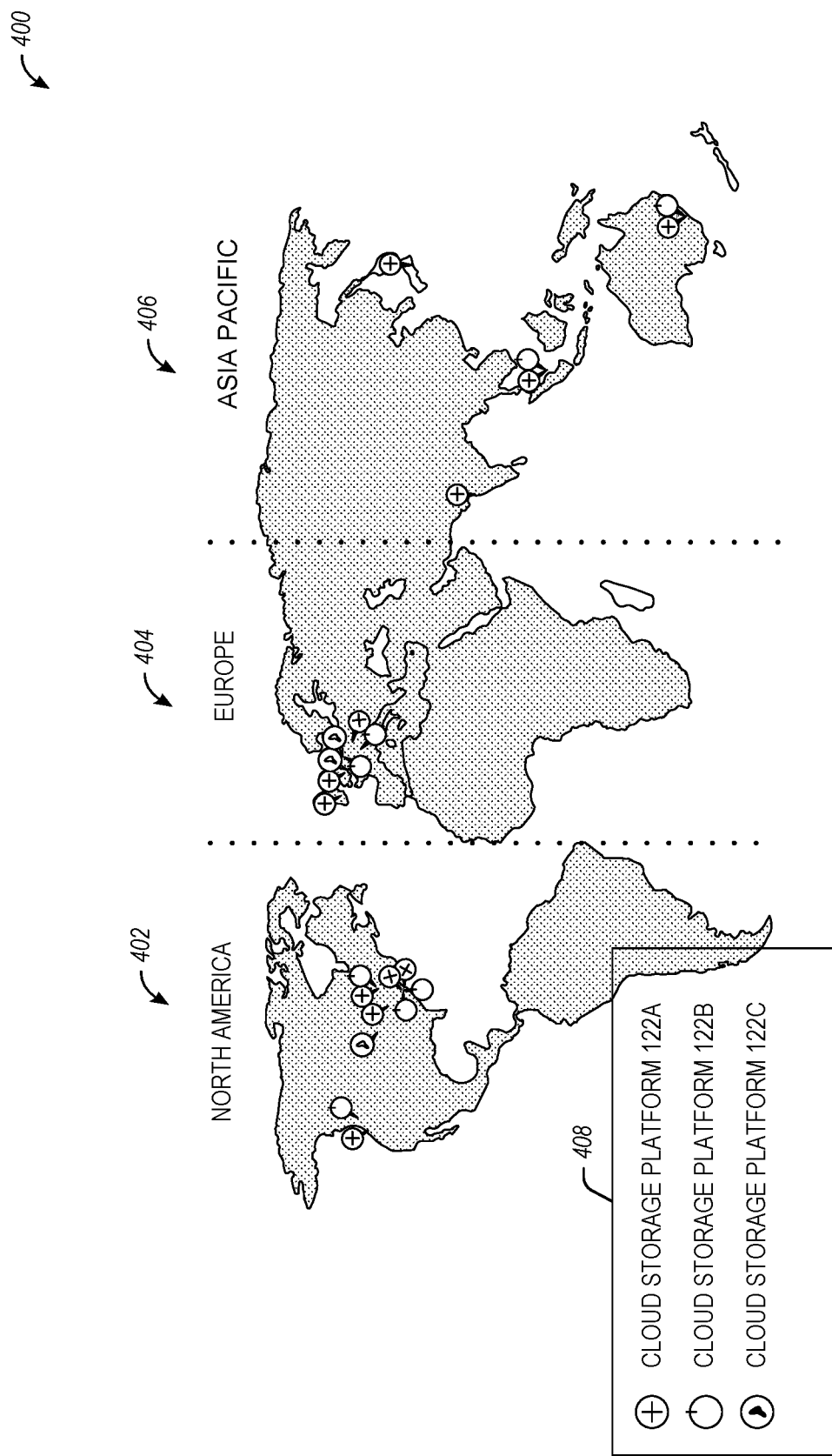
FIG. 4 illustrates an example regional-deployment map for the example database system of FIG. 1, according to some example embodiments.

FIG. 4 illustrates an example regional-deployment map 400 for the example database system of FIG. 1, according to some example embodiments. The regional-deployment map 400 is presented purely by way of example and not limitation, as different numbers and/or boundaries of regions could be demarcated in different implementations. As can be seen in FIG. 4, the regional-deployment map 400 includes three example geographic regions: North American region 402, European region 404, and Asia Pacific region 406. Moreover, various instances of deployments of the network-based database system 102 are depicted on the regional-deployment map 400. A legend 408 shows symbols used for three different deployments of the network-based database system 102, including deployments that are hosted by the cloud-storage platform 122A, deployments hosted by the cloud-storage platform 122B, and deployments that are hosted by the cloud-storage platform 122C. Cloud-storage platforms 122A, 122B, and 122C can be collectively referred to as cloud-storage platforms 122, which are also illustrated in FIG. 1.

In some aspects, a data share (also referred to as a share or a share object) can include a plurality of different data objects (e.g., tables, views, user-defined functions (UDFs), etc.) and there can be pre-existing replication support for such shares. However, native apps are pushing the boundary of objects allowed in a share and many native app dependencies are not safe for replication, such as internal stage replication, API gateways, etc. Due to replication failure risks, database replication can skip replicating unsupported objects, and auto-fulfillment replicas will silently miss objects, rendering the replication failed.

In some embodiments, for each new object type that is introduced, LAF compatibility can use the following configurations: the object type can be successfully replicated (and if it is not yet supported by replication, LAF needs to warn about it), and LAF is discovering all of the object and sub-object dependencies of a listing share and managing the correct set of replication groups for these objects. The two issues with existing LAF compatibility solutions are as follows:

(a) Only a basic up-front check of LAF compatibility is performed by looking at the share grants during auto-fulfillment enablement time. This check is not recursively visiting all descendent objects of the share.
(b) The share and its objects can mutate over time and when a LAF compatible share becomes incompatible, one or more replication refresh tasks can still succeed (since unsupported database objects can be silently skipped during a refresh), and any errors may not be indicated proactively to the data provider. The provider can get notified of the error when a data consumer notifies the data provider about broken data.

The disclosed techniques can be used to configure a compatibility verification manager that can use at least one additional manager (also referred to as a "visitor") to visit all of the objects inside a share and to check that all objects are safe for auto-fulfillment. Additionally, the at least one visitor can also produce a "specification" of replication groups that need to be created to fully replicate the share. An example CVM with two additional managers (or visitors) is discussed in connection with FIG. 5. In some embodiments, each visitor can rely on each encountered object's data access object (DAO) class to decide whether the object entities are LAF safe or not. If an entity type's DAO has not implemented a LAF interface, then it can be considered not safe for LAF. A list of incompatible entities can be configured and used for reporting actionable errors back to the user (e.g., a data provider).

Figure 5:
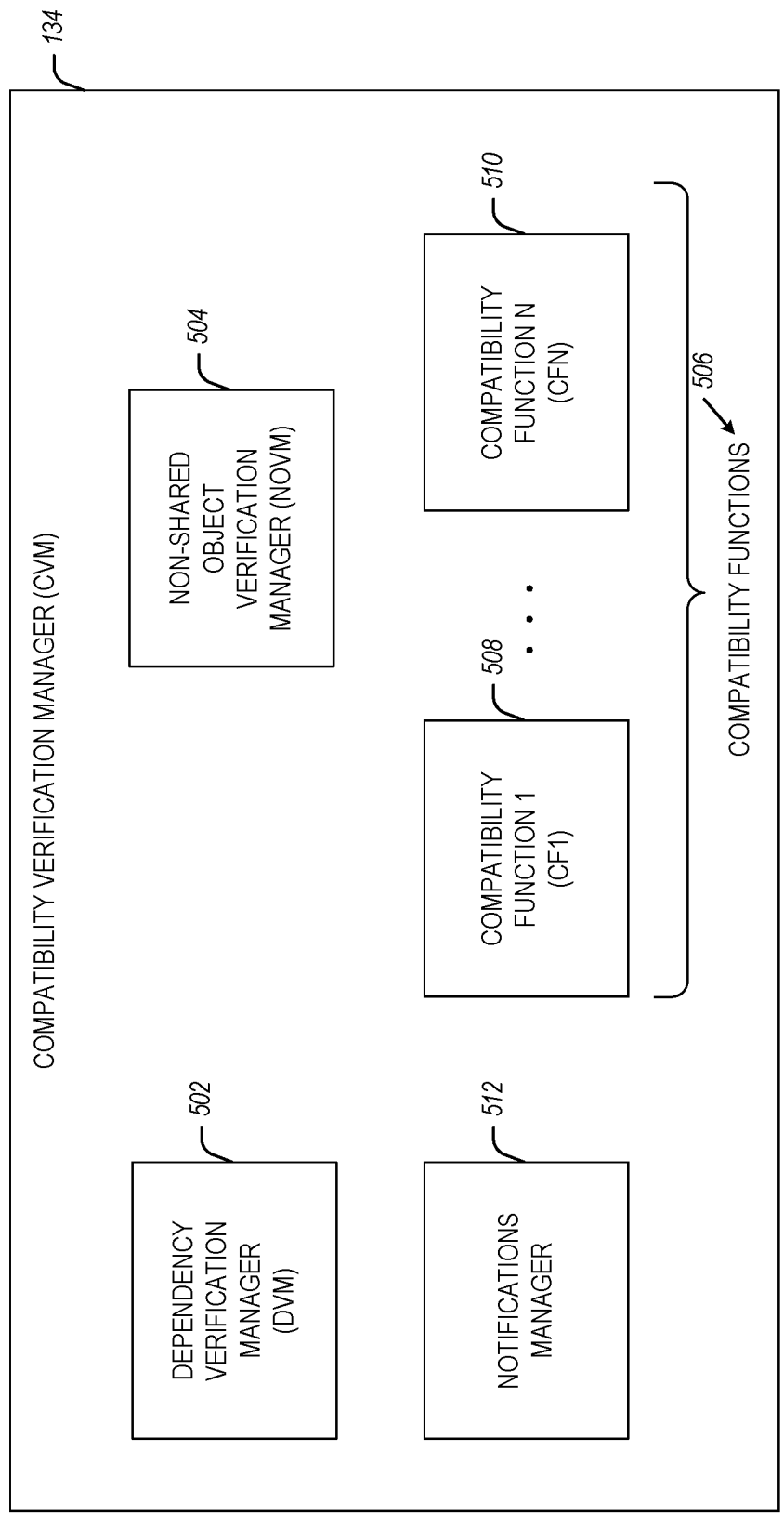
FIG. 5 is a diagram of a CVM configured in the network-based database system of FIG. 1, according to some example embodiments.

FIG. 5 is a diagram of CVM 134 configured in the network-based database system of FIG. 1, according to some example embodiments. Referring to FIG. 5, CVM 134 includes a dependency verification manager (DVM) 502 and a non-shared object verification manager (NOVM) 504 (both DVM 502 and NOVM 504 can also be referred to as "visitors" as they visit (or parse) a share to determine compatibility issues with corresponding data objects). In some embodiments, CVM 134 further includes compatibility functions 506, which can include a plurality of different compatibility functions as discussed herein (e.g., compatibility function 1 (CF1) 508, . . . , compatibility function N (CFN) 510). CVM 134 further includes a notifications manager 512, which can be configured to provide a notification based on the result of the compatibility verifications performed by the DVM 502 and the NOVM 504.

Figure 6:
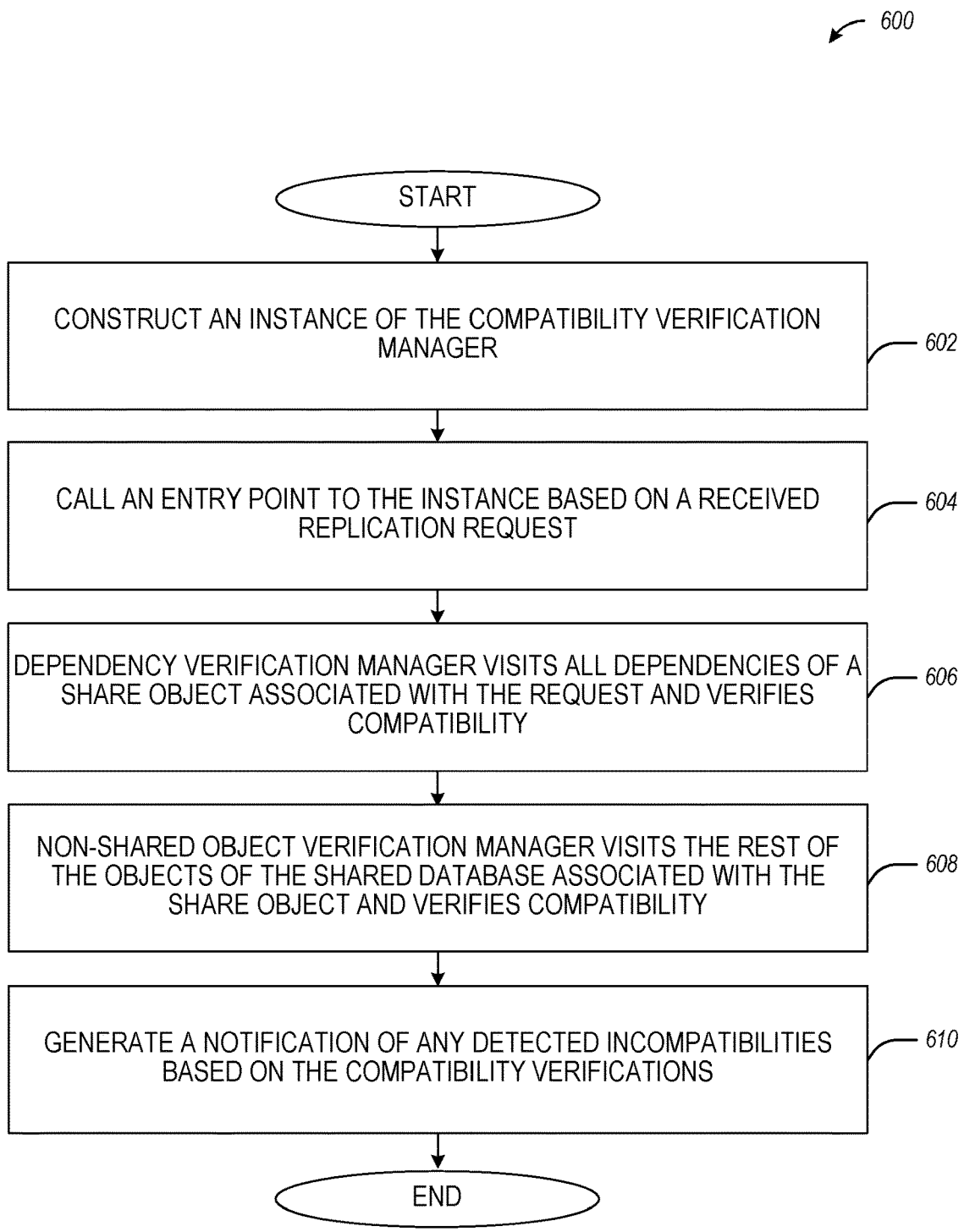
FIG. 6 is a flow diagram illustrating the operations of a CVM in performing a method for compatibility verification, according to some example embodiments.

FIG. 6 is a flow diagram illustrating the operations of CVM 134 in performing method 600 for compatibility verification, according to some example embodiments. Method 600 includes operations 602-610. By way of example and not limitation, method 600 is described as being performed by CVM 134 or machine 1200 of FIG. 12 configured to perform disclosed functionalities. Any of the methods disclosed herein can be configured as computer-implemented methods performed within the network-based database system 102.

At operation 602, an instance of the compatibility verification manager 134 can be generated with corresponding configurations.

At operation 604, an entry point to the instance can be called (e.g., based on a received replication request associated with a listing of a data provider).

At operation 606, CVM 134 uses the dependency verification manager (DVM) 502 to visit the share dependencies associated with a share object (e.g., a share corresponding to the listing for which replication is requested). DVM 502 further checks the compatibility of all data objects associated with the share.

At operation 608, CVM 134 uses the non-shared object verification manager (NOVM) 504 to visit the rest of the objects (non-dependencies) and check their compatibility. For example, NOVM 504 can visit data objects of the database associated with the share, which data objects have not been verified by DVM 502.

At operation 610, CVM 134 compiles the verification results and generates a notification of any detected incompatibilities (e.g., using the notifications manager 512) based on the compatibility verifications performed by DVM 502 and NOVM 504.

Referring to FIG. 5 and FIG. 6, DVM 502 and NOVM 504 can use compatibility functions 506 during operations 606 and 608. More specifically, the following compatibility functions (CFs) 506 can be used by DVM 502 and NOVM 504 in determining if a share is compatible with LAF:

(a) isSkippable(obj): this compatibility function returns true if the object itself will be skipped and does not fail the replication.
(b) isReplicable(obj): this compatibility function returns true if the object itself is replicable.
(c) isLocal(obj): this compatibility function returns true if the object is in the shared provider database.

(d) noCrossRef(obj): this compatibility function returns true if the object could fail the replication if not present in a secondary database.

(e) dep(obj): this compatibility function lists the objects directly referenced by the object "obj".

(f) isShareDependency(x): this compatibility function returns true if the object is directly or indirectly referenced by the target share. For all y in dep(target share), isShareDependency(y) and isShareDependency (x)-> (for all y in dep(x), isShareDependency(y)) can be used.

In some embodiments, for a standard LAF, the entire database associated with the listing may need to be replicated. In this case, CVM 134 can perform the compatibility verifications (e.g., using DVM 502 and NOVM 504) to ensure the share is a function for all data object x in the shared database with the following compatibility functions being true:

(a) isSkippable(x) | isReplicable(x). More specifically, every object in the shared provider database associated with the share will not fail the replication by itself (i.e., it can be replicated or skipped silently). An example violation includes a Python UDF inside a database without a parameter enabled will fail the replication.

(b) for all y in dep(x), noCrossRef(y)->isLocal (y). In some aspects, noCrossRef(x) includes tag and policy objects. If any object references a tag or a policy object, the referenced tag or policy object needs to be in the same database. In some aspects, this rule also holds for non-share-dependency objects, as violation could fail the replication. An example violation includes a table in a shared database that references a policy object outside the current database (regardless of whether the table itself is shared or not).

(c) isShareDependency(x)->isLocal(x) and isReplicable (x). More specifically, every directly or indirectly shared object is in the shared provider database (e.g., the database associated with the share of the listing that is auto-fulfilled) and is replicable. An example violation includes a shared view that references a table in another database with or without a reference usage grant.

Figure 7:
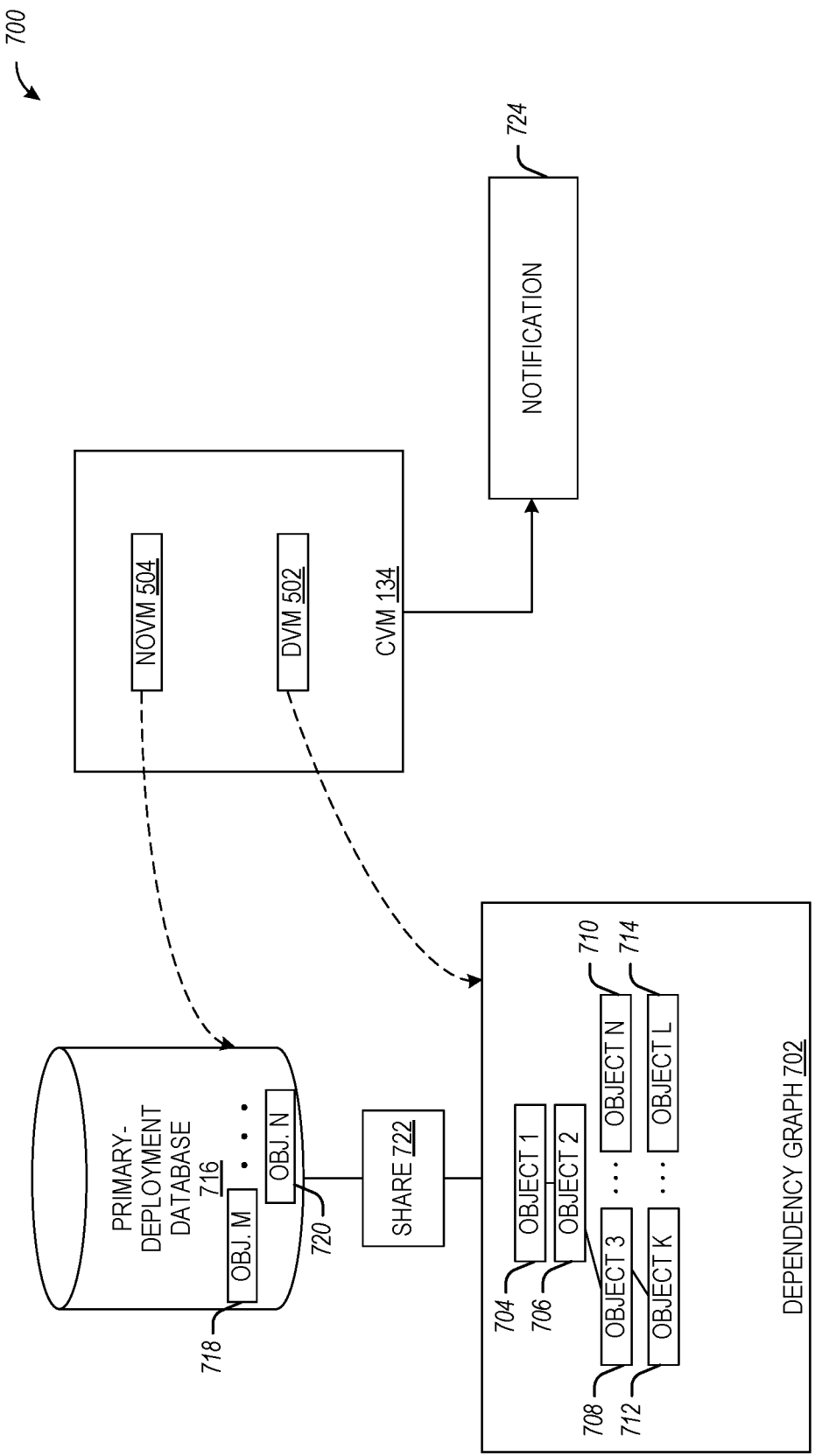
FIG. 7 is a diagram of a CVM performing compatibility verification of a plurality of data objects using a dependency verification manager and a non-shared object verification manager, according to some example embodiments.

FIG. 7 is a diagram 700 of CVM 134 performing compatibility verification of a plurality of data objects using a dependency verification manager and a non-shared object verification manager, according to some example embodiments. Referring to FIG. 7, a data provider can set up a listing with auto-fulfillment configurations using a share object 722 (also referred to as a share 722) (e.g., allowing an automatic replication of the listing to an account of a data consumer). Share 722 is associated with database 716 (also referred to as primary deployment database 716), which includes data objects 718, . . . , 720 (e.g., object M, . . . , N).

Share 722 can include a plurality of objects, such as objects 704, 706, 708, . . . , 710, and 712, . . . , 714 forming a dependency graph 702. In some embodiments, objects 718, . . . , 720 may not be included in share 722 (e.g., objects 718, . . . , 720 are non-shared objects). In some embodiments, some of the shared objects 704, . . . , 714 of share 722 can be included in database 716.

Since the requirements for shared and non-shared objects are different, CVM 134 uses two separate visitors (or managers), such as DVM 502 and NOVM 504 to perform compatibility verification of shared and non-shared objects respectively. In some aspects, CVM 134 is configured to generate and output a notification 724 based on the compatibility verification performed by DVM 502 and NOVM 504 (e.g., to indicate to the data provider the result of the compatibility verification so that the provider can fix any potential replication faults associated with share 722).

For example, DVM 502 can perform compatibility recommendations of the shared objects (e.g., objects 704, . . . , 714) associated with share 722 based on traversing dependency graph 702, which visits every object that is directly or indirectly shared by the share. In some embodiments, the top-level object 704 can be a share object, and the possible dependencies for each object type that DVM 502 can traverse in dependency graph 702 are as follows:

(a) If an object in the dependency graph 702 is a share, possible dependencies include a database, a schema, a table, a view, a function, and a role (e.g., a database role).

(b) If an object in the dependency graph 702 is a role, possible dependencies include a database, a schema, a table, a view, and a function.

(c) If an object in the dependency graph 702 is a database, there can be no possible dependencies.

(d) If an object in the dependency graph 702 is a schema, there can be no possible dependencies.

(e) If an object in the dependency graph 702 is a table, possible dependencies include a table, a function, a view, a policy, a tag, and a stage.

(f) If an object in the dependency graph 702 is a function, possible dependencies include a table, a function, a view, and a stage.

(g) If an object in the dependency graph 702 is a tag, possible dependencies include a policy.

In some embodiments, NOVM 504 is configured to traverse the entire shared provider database 716 (or multiple databases) and check all objects 718, . . . , 720 that are neither directly nor indirectly shared via share 722. In this regard, CVM 134 uses NOVM 504 to find all objects that could cause the replication to fail even if the objects are not directly or indirectly shared. In some embodiments, the objects in database 716 that are in dependency graph 702 and have already been visited by DVM 502 can be skipped to improve processing time.

In some embodiments, DVM 502 and NOVM 504 can determine whether a table can be replicated based on the table type. In some aspects, for the following table types, a specific parameter can indicate whether to replicate the object or throw an error:

(a) For a materialized view (isMaterializedView( )), the following parameter can be used: GLOBAL_REPLICATION_INCLUDE_MV_IN _SYNCHRONIZATION.

(b) For an external table (e.g., external_table (isExternalTable( )), the following parameter can be used: GLOBAL_REPLICATION_INCLUDE_ET_IN_SYNCHRONIZATION.

(c) For a key_value_index (isKey Value( )), the following parameter can be used: GLOBAL REPLICATION INCLUDE HT IN SYNCHRONIZATION.

(d) For an event table (e.g., event_table (isEventTable( )), the following parameter can be used: GLOBAL_REPLICATION_INCLUDE_EVENT_TABLE_IN_SYNCHRONIZATION.

(e) For an iceberg (isIceberg( )), the following parameter can be used: GLOBAL_REPLICATION_INCLUDE_ICEBERG_TABLE_IN_SYNCHRONIZATION.

(f) For a materialized table (isMaterializedTable( )), the following parameter can be used: GLOBAL_REPLICATION_INCLUDE_DYNAMIC_TABLE_IN_SYNCHRONIZATION.

In some embodiments, the following types of tables are supported and can pass verification by CVM 134 without parameter check: a table, a view, a materialized_view, and a directory_table.

In some embodiments, NOVM 504 can be configured to explicitly check whether the table references tags or policy objects that are outside of the current database 716.

In some embodiments, DVM 502 and NOVM 504 can determine whether a function can be replicated based on the function type. In some aspects, for the following function types, a specific parameter can indicate whether to replicate the object or throw an error:

(a) For function extension_udf(getLanguage( ).isExtensionLanguage( )), the following parameter can be used: GLOBAL_REPLICATION_INCLUDE_EXTENSION_UDF_IN_SYNCHRONIZATION.

(b) For function python_udf (e.getLanguage( )==Language.PYTHON), the following parameter can be used: GLOBAL_REPLICATION_INCLUDE_PYTHON_UDF_IN_SYNCHRONIZATION.

In some embodiments, DVM 502 can indicate an error if an external function, stored procedure, or extension language functions are encountered before they are supported. In some aspects, when external functions and extension functions are supported, CVM 134 can also check their dependencies (e.g. stage, integration) as well.

In some embodiments, when visiting a tag, NOVM 504 can check whether the tag references a policy object outside of the current database.

In some embodiments, DVM 502 and NOVM 504 can perform the following checks for policy objects (for both non-shared and shared object checks):

(a) isReplicationSupported( ) and whether it will fail the replication depends on the policy kind.

(b) Whether the policy kind is enabled in the data provider account.

In some embodiments, a stage object can be blocked as a share dependency. A stage object can be allowed as a non-dependency, as it is not blocking replication even if it is not supported.

In some embodiments, the following objects are allowed as non-shared objects, and may not be visited as share dependencies: constraint, file_format, pipe, resource_group, sequence, table_column, user_task, stream, and secret.

Figure 8:
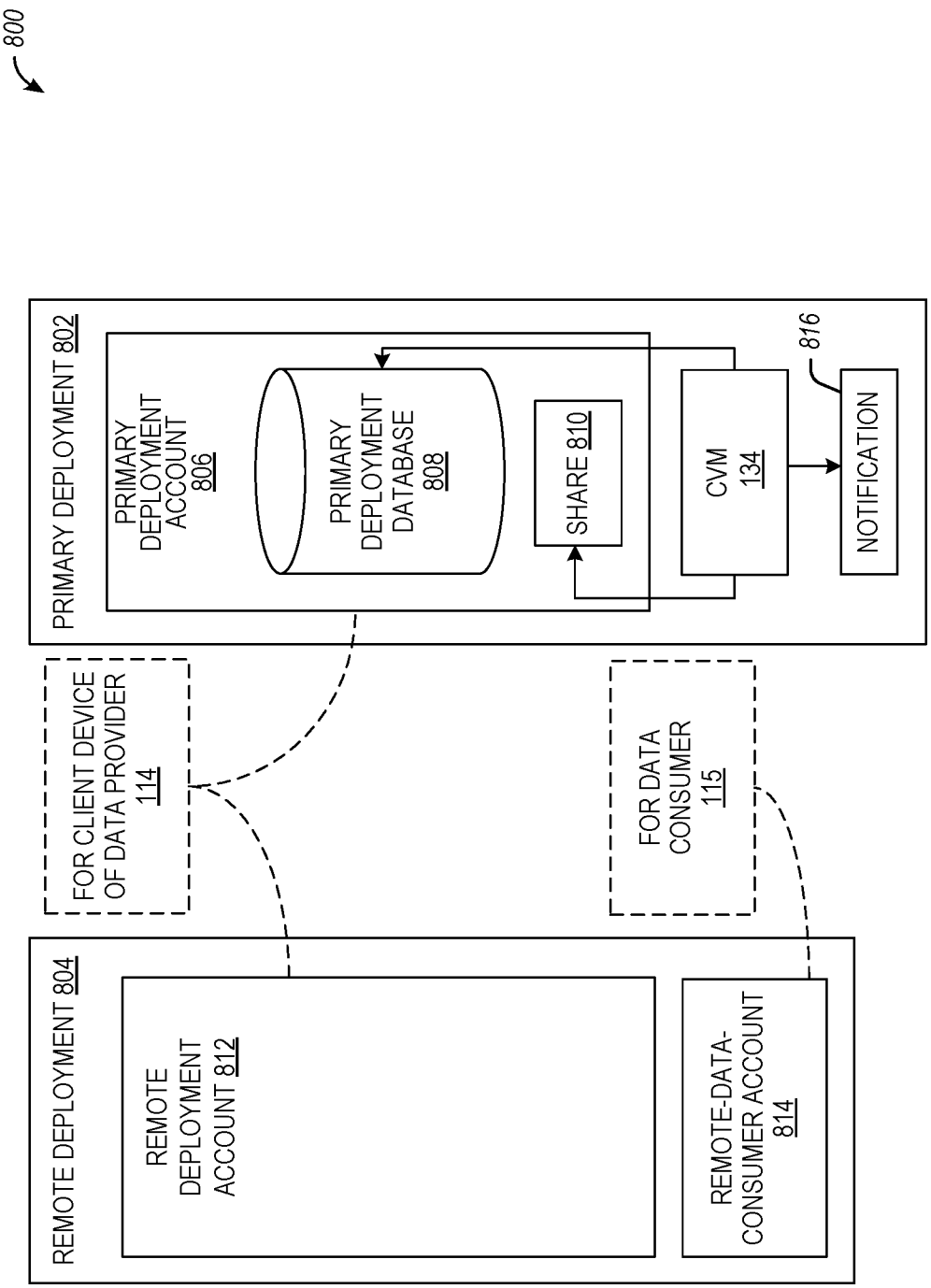
FIG. 8 illustrates a first example state of an example multi-deployment arrangement using a compatibility verification manager (CVM) for a listing auto-fulfillment, according to some example embodiments.

FIG. 8 illustrates a first example state 800 of an example multi-deployment arrangement using a compatibility verification manager (CVM) for a listing auto-fulfillment, according to some example embodiments.

Figure 9:
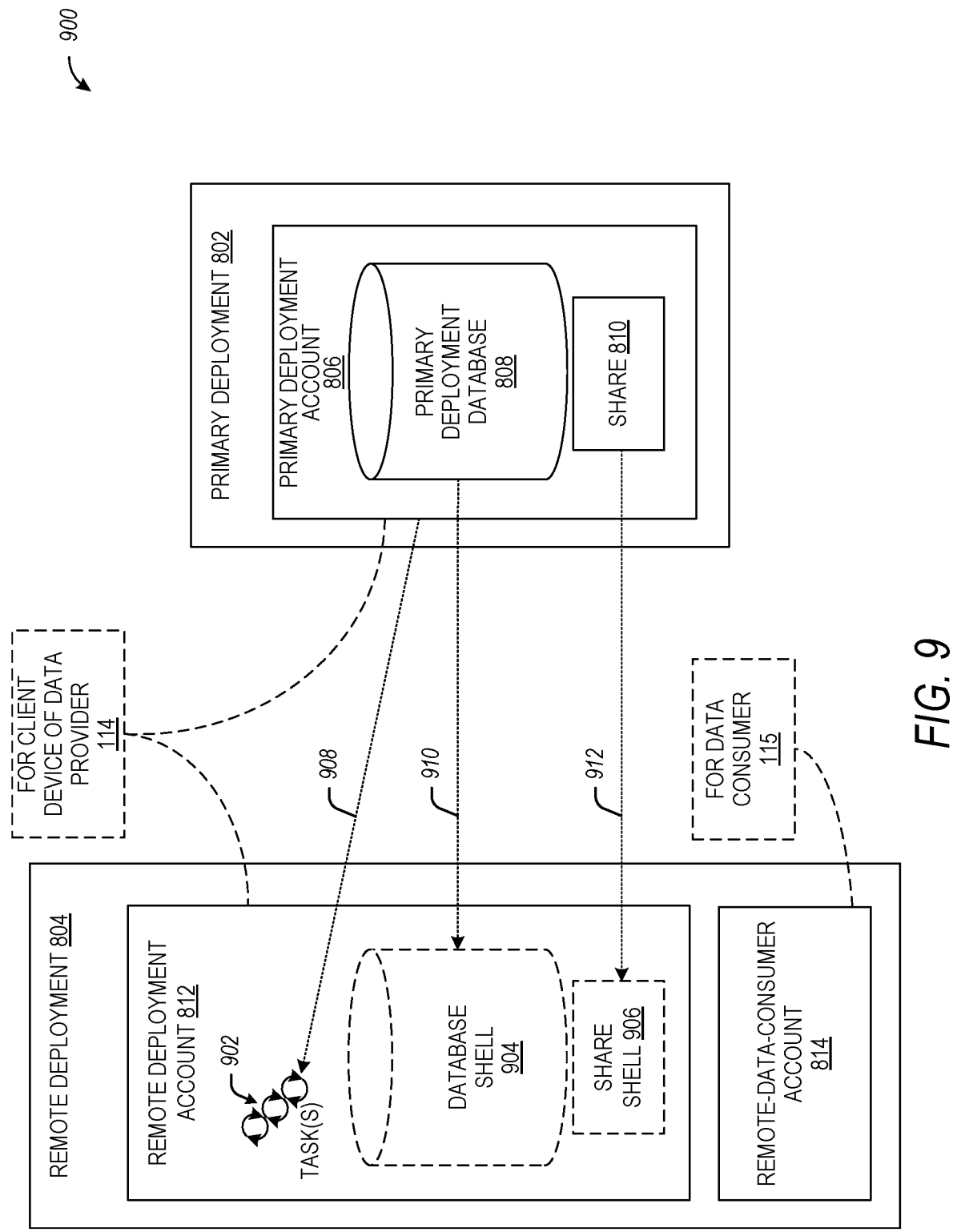
FIG. 9 illustrates a second example state of the example multi-deployment arrangement of FIG. 8, according to some example embodiments.

FIG. 9 illustrates a second example state 900 of the example multi-deployment arrangement of FIG. 5, according to some example embodiments.

Figure 10:
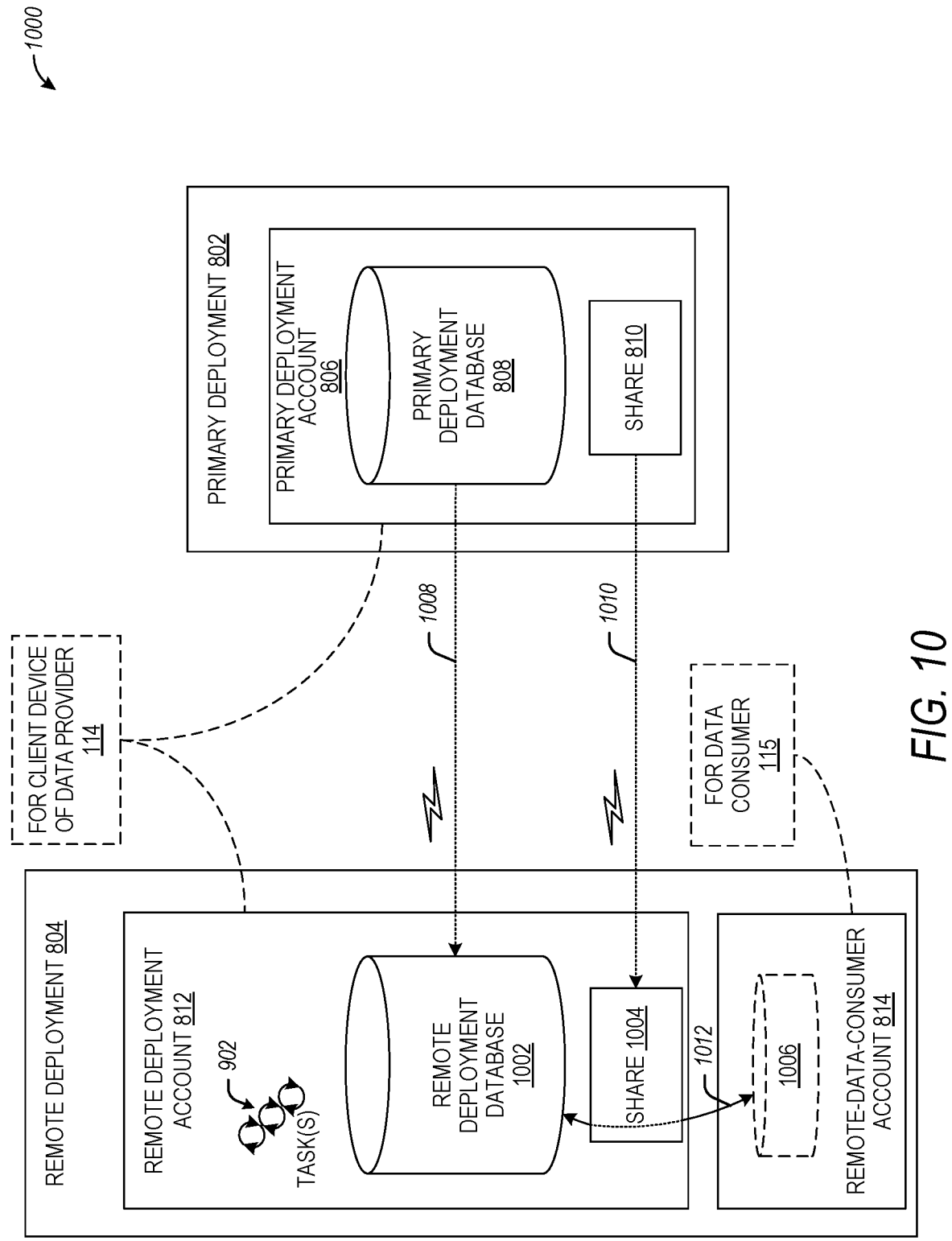
FIG. 10 illustrates a third example state of the example multi-deployment arrangement of FIG. 8, according to some example embodiments.

FIG. 10 illustrates a third example state 1000 of the example multi-deployment arrangement of FIG. 5, according to some example embodiments.

In some embodiments, the network-based database system 102 has at least two deployments as shown in FIG. 8, which generally depicts an example state 800 of an example multi-deployment arrangement. The example multi-deployment arrangement of FIG. 8 includes a primary deployment 802 and a remote deployment 804 of the network-based database system 102. In this first example scenario, the data provider has a primary deployment account 806 at the primary deployment 802, and a remote-deployment account 812 at the remote deployment 804. Moreover, in this first example scenario, the remote deployment 804 also includes a remote-data-consumer account 814 that is associated with the data consumer 115. The configurations described herein are by way of example and not limitation.

The data provider (e.g., the user of client device 114) in this first example scenario also has a primary deployment database 808 that is resident in its primary deployment account 806 at the primary deployment 802 of the network-based database system 102. Also resident in the primary deployment account 806 is a primary deployment share 810, which in various embodiments is a companion object to the primary deployment database 808. As discussed herein, in at least some embodiments, a share is an object that acts as an access-control (including, e.g., visibility control) container for, e.g., a database such as the primary deployment database 808. In different embodiments, outside of the network-based database system 102 itself, only entities that have had a given share shared with them can see and access whatever one or more objects (e.g., one or more databases) are encompassed by that given share. A given entity, user, and/or the like could also or instead have been assigned privileges to access a given share in a manner that does not necessarily fit the "sharing a share" paradigm that is discussed in the present disclosure by way of example. Other particular rules-based access control (RBAC) approaches could be used as well.

In some embodiments, the primary deployment 802 further includes CVM 134, which is configured to perform the disclosed compatibility verification functions for share 810 associated with primary deployment database 808. CVM 134 can perform the compatibility verification at the time a listing of the data provider is configured for automatic auto-fulfillment and before such listing is replicated at the remote-data-consumer account 814. In this regard, CVM 134 can generate and output a notification 816 of any incompatibilities and potential replication faults that have been detected during the compatibility verification of share 810.

FIG. 9 depicts a second example state 900 which is later in this example than the state 800 of FIG. 8, which is essentially depicting an example initial condition before an execution of a replication process. It is noted that, in at least one embodiment, an initial state such as the state 800 that is depicted in FIG. 8 does not yet have any accounts established in the remote deployment 804. In some aspects, network-based database system 102 provisions the remote deployment account 812 of the data provider at the remote deployment 804 of the network-based database system 102. In particular, the network-based database system 102 provisions the remote deployment account 812 with a set of one or more of what is referred to in the present disclosure as "replication-preparation objects."

Each of the provisioned replication-preparation objects is, in at least one embodiment, associated with the primary deployment database 808 that is resident in the primary deployment account 806 of the data provider at the primary deployment 802 of the network-based database system 102. In the depicted example, the replication-preparation objects are (i) a set of one or more remote-deployment tasks 902, (ii) a remote-deployment database shell 904, and a remote-deployment share shell 906. As discussed herein, the database shell 904 and the share shell 906 include the structure of the corresponding object but do not, in the case of the remote-deployment database shell 904, contain any substantive data from the primary deployment database 808, and no active syncing is taking place in FIG. 9.

In some aspects, in accordance with this first example scenario, before any customer (data consumer) of the data provider requests a remote instance of a given database (e.g., via a replication request for a listing that can be auto-fulfilled), the network-based database system 102 has configured one or more tasks, a shell database, and a shell share in place at the remote deployment account 812 at the remote deployment 804. Task 902 can be configured to monitor for database replication requests in the remote deployment account 812 in which they have been provisioned.

The one-time transmission (e.g., provisioning) of the various tasks, database shells, and share shells are indicated in FIG. 9 by the provisioning arrows 908, 910, and 912. While the term "one-time transmission" is used herein, there could be multiple messages, occasional updates, and so forth, but not a pushed stream of active-syncing updates.

In some aspects, the network-based database system 102 detects receipt, after the provisioning of the shells, of a database replication request that is associated with the data consumer 115, which is a consumer of data from the data provider, as depicted in FIG. 1. The database replication request is sent to request availability (to the data consumer 115) of a local instance of the primary deployment database 808 associated with share 810 in the remote deployment account 812 of the data provider at the remote deployment 804.

In response to detecting receipt of the database replication request, the network-based database system 102 performs one or more of what is referred to in the present disclosure as "remote-deployment-activation operations." In at least one embodiment, the performing of the one or more remote-deployment-activation operations makes a local instance of the primary deployment database 808 available to the data consumer 115 in the remote deployment account 812 of the data provider at the remote deployment 804. In some embodiments, the remote deployment activations are performed only after CVM 134 has performed compatibility verification of all data objects associated with share 810 and its corresponding database 808 using the disclosed techniques.

As shown in FIG. 10, the provisioning arrow 908 is gone and in its place is an active-syncing arrow 1008 (with a lightning-bolt icon meant to convey active syncing) from the primary deployment database 808 to the remote deployment database 1002, which has replaced the remote deployment database shell 904 due to the active syncing. Similarly, the provisioning arrow 910 is gone, and in its place is an active-syncing arrow 1010 from the primary deployment share 810 to the remote deployment share 1004, which has replaced the remote deployment share shell 906. Also depicted in FIG. 10 is that the remote-data-consumer account 814 now includes a database reference object 1006, which is used in at least one embodiment by the remote-data-consumer account 814 to access the remote deployment database 1002 via the remote deployment share 1004, as indicated by a database-access arrow 1012.

In some embodiments, the one or more remote-deployment-activation operations involve invoking a database-refresh operation that initiates the pushing of database data from the primary deployment database 808 to the remote deployment database shell 904, affecting the transition of the remote deployment database shell 904 to the remote deployment database 1002. The remote deployment database 1002 in at least one embodiment is, once the syncing has caught up to be current, a local instance of the primary deployment database 808 in the remote deployment account 812 of the data provider at the remote deployment 804.

Similarly, in some embodiments, the one or more remote-deployment-activation operations involve invoking a share refresh operation that provides the data consumer 115 (via the remote-data-consumer account 814) with access to the remote deployment database 1002 via the remote deployment share 1004. A share refresh option of this type may initiate the pushing of share data from the primary deployment share 810 to the remote deployment share shell 906. The pushing of share data may modify the remote deployment share shell 906 into the remote deployment share 1004 that is resident in the remote deployment account 812 of the data provider at the remote deployment 804. In some embodiments, the one or more remote-deployment-activation operations may involve operations that make the remote deployment share 1004 visible to the remote-data-consumer account 814, illustrated by the fact that the remote deployment share 1004 is at the edge of the remote deployment account 812 in FIG. 10, compared to the internal position in the remote deployment account 812 of the remote deployment share shell 906 in FIG. 9.

In at least one embodiment, consumer accounts such as the remote-data-consumer account 814 receive read-only access to the relevant remote database instance. Moreover, in at least one embodiment, the network-based database system 102 names and creates the data provider remote accounts, such as the remote deployment account 812, and limits the privileges of these accounts to tasks related to database replication and refresh and associated tasks in accordance with the present disclosure.

When a data consumer requests access to a remote deployment database that is already syncing and has already been made operable for one or more prior consumers, that next data consumer may simply be granted access to the relevant share, which will give them access to the desired database. If a data customer that is presently the only data customer using a given remote-deployment database decides to unsubscribe or otherwise stop using that data, the network-based database system 102 may pause the syncing but may persist the data for some time in case another consumer requests access.

In at least one embodiment, the network-based database system 102 uses a secure shell data connection between the primary deployment 802 and remote deployments such as the remote deployment 804. The network-based database system 102 may limit the use of embodiments of the present disclosure to accounts that have enabled the capability to communicate over such a secure connection.

Furthermore, to initiate the creation of remote deployment access to a given database, a user (e.g., admin) at a data provider may create a listing on a marketplace-type interface where various data sources are made available for purchase, subscription, and the like. Once provided with a replication script, the data provider may execute that script and gain access following embodiments of the present disclosure. Additionally, a provider can enable an auto-fulfillment feature for one or more of its listings, which can trigger the compatibility verification of the shares associated with such listings by the CVM 134 (e.g., using the disclosed techniques).

Figure 11:
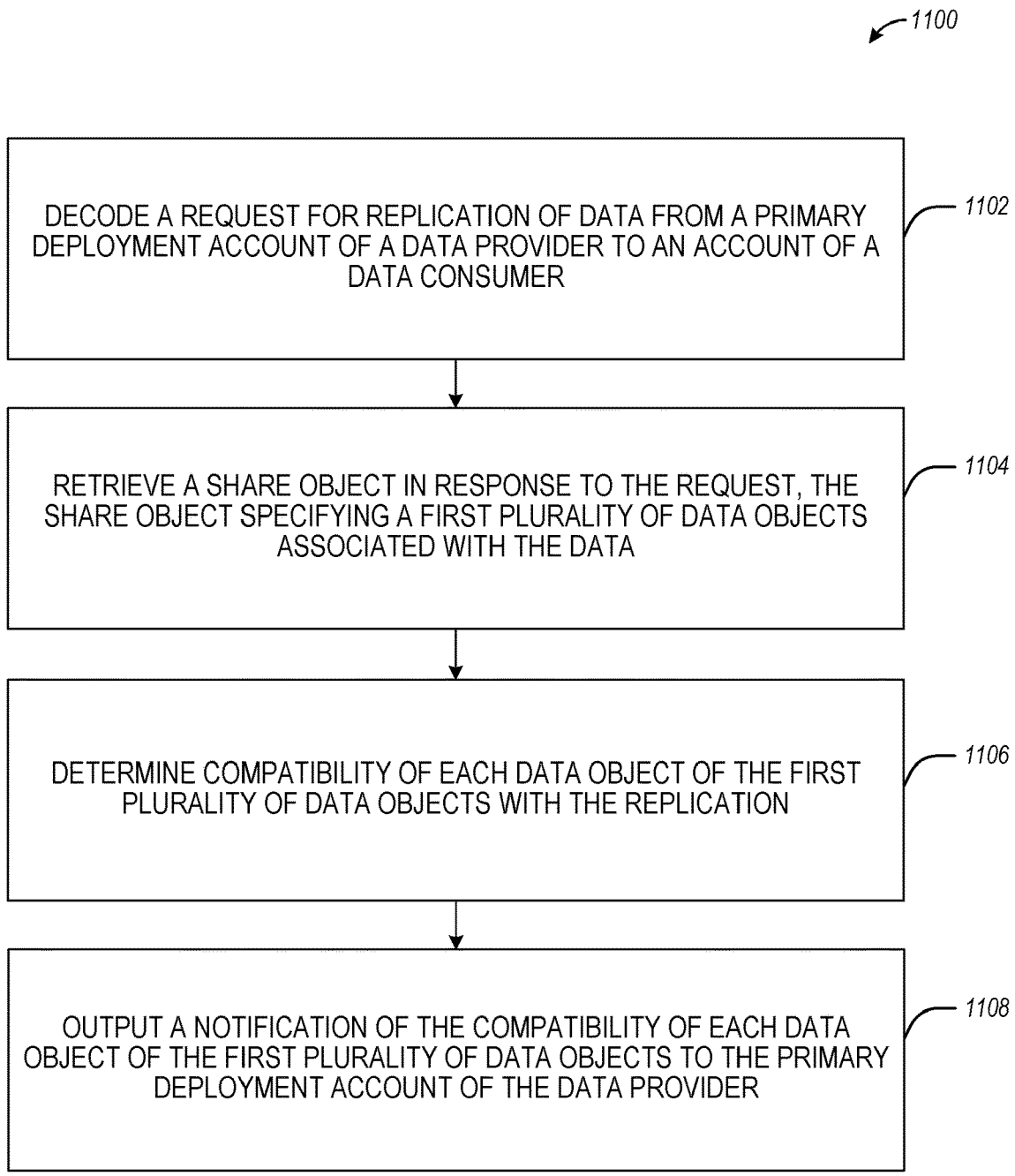
FIG. 11 is a flow diagram illustrating the operations of a CVM in performing a method for compatibility verification, according to some example embodiments.

FIG. 11 is a flow diagram illustrating the operations of a CVM in performing method 1100 for compatibility verification, according to some example embodiments. Method 1100 includes operations 1102, 1104, 1106, and 1108. By way of example and not limitation, method 1100 is described as being performed by CVM 134 or machine 1200 of FIG. 12 configured to perform disclosed functionalities. Any of the methods disclosed herein can be configured as computer-implemented methods performed within the network-based database system 102.

At operation 1102, a request for replication of data from a primary deployment account of a data provider to an account of a data consumer is received and decoded. For example, replication request 132 originating from data consumer 115 is received at the network-based database system 102 and is detected by CVM 134.

At operation 1104, a share object is retrieved in response to the request. For example and about FIG. 7, CVM 134 retrieves share object 722 associated with a listing of the data provider for which replication was requested. In some aspects, the share object specifies a first plurality of data objects associated with the data. For example, share object 722 specifies data objects 704, . . . , 714 listed in dependency graph 702.

At operation 1106, the compatibility of each data object of the first plurality of data objects with the replication is determined. For example, DVM 502 performs compatibility verification of data objects 704, . . . , 714 associated with share object 722.

At operation 1108, a notification of the compatibility of each data object of the first plurality of data objects is generated and communicated to the primary deployment account of the data provider. For example, CVM 134 generates and outputs notification 724 based on the results of the compatibility verification performed by DVM 502 and NOVM 504.

Figure 12:
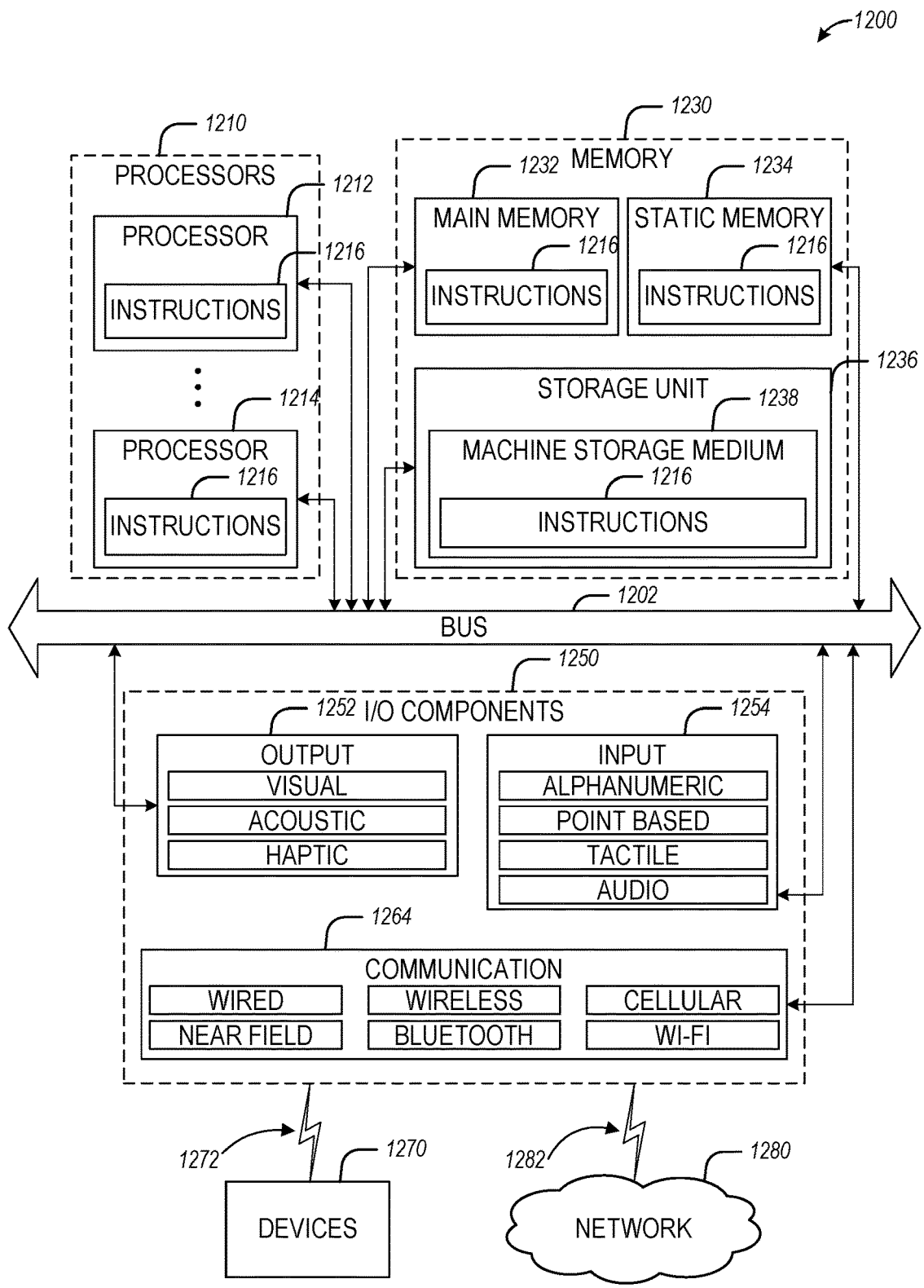
FIG. 12 illustrates a diagrammatic representation of a machine in the form of a computer system within which a set of instructions may be executed for causing the machine to perform any one or more of the methodologies discussed herein, according to some example embodiments.

FIG. 12 illustrates a diagrammatic representation of machine 1200 in the form of a computer system within which a set of instructions may be executed for causing machine 1200 to perform any one or more of the methodologies discussed herein, according to an example embodiment. Specifically, FIG. 12 shows a diagrammatic representation of machine 1200 in the example form of a computer system, within which instructions 1216 (e.g., software, a program, an application, an applet, an app, or other executable code) for causing the machine 1200 to perform any one or more of the methodologies discussed herein may be executed. For example, instructions 1216 may cause machine 1200 to execute any one or more operations of methods 600 and 1100 (or any other technique discussed herein, for example in connection with FIGS. 4-11). As another example, instructions 1216 may cause machine 1200 to implement one or more portions of the functionalities discussed herein. In this way, instructions 1216 may transform a general, non-programmed machine into a particular machine 1200 (e.g., the client device 114, the compute service manager 108, or a node in the execution platform 110) that is specially configured to carry out any one of the described and illustrated functions in the manner described herein. In yet another embodiment, instructions 1216 may configure the client device 114, the compute service manager 108, and/or a node in the execution platform 110 to carry out any one of the described and illustrated functions in the manner described herein, which functions can be configured or performed by the CVM 134.

In alternative embodiments, the machine 1200 operates as a standalone device or may be coupled (e.g., networked) to other machines. In a networked deployment, machine 1200 may operate in the capacity of a server machine or a client machine in a server-client network environment, or as a peer machine in a peer-to-peer (or distributed) network environment. Machine 1200 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines that individually or jointly execute instructions 1216 to perform any one or more of the methodologies discussed herein.

Machine 1200 includes processors 1210, memory 1230, and input/output (I/O) components 1250 configured to communicate with each other such as via a bus 1202. In some example embodiments, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within machine storage medium 1238 of the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, communication components 1264 may include a network interface component or another suitable device to interface with network 1280. In further examples, communication components 1264 may include wired communication components, wireless communication components, cellular communication components, and other communication components to provide communication via other modalities. The device 1270 may be another machine or any of a wide variety of peripheral devices (e.g., a peripheral device coupled via a universal serial bus (USB)). For example, as noted above, machine 1200 may correspond to any one of the client devices 114, the compute service manager 108, or the execution platform 110, and device 1270 may include the client device 114 or any other computing device described herein as being in communication with the network-based database system 102 or the cloud storage platform 104.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1280 or a portion of network 1280 may include a wireless or cellular network, and coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of several well-known transfer protocols (e.g., hypertext transfer protocol (HTTP)). Similarly, instructions 1216 may be transmitted or received using a transmission medium via coupling 1272 (e.g., a peer-to-peer coupling or another type of wired or wireless network coupling) to device 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a request for replication of data from a primary deployment account of a data provider to an account of a data consumer; retrieving a share object in response to the request, the share object specifying a first plurality of data objects associated with the data; determining compatibility of each data object of the first plurality of data objects with the replication; and outputting a notification of the compatibility of each data object of the first plurality of data objects to the primary deployment account of the data provider.

In Example 2, the subject matter of Example 1 includes, the operations further comprising: determining a dependency graph for the first plurality of data objects specified by the share object, the dependency graph including the share object as a top-level object, and a shared database associated with the share object.

In Example 3, the subject matter of Example 2 includes, the operations further comprising: traversing the dependency graph and applying at least one of a plurality of compatibility functions to each data object of the first plurality of data objects during the traversing to determine the compatibility of the data object.

In Example 4, the subject matter of Example 3 includes subject matter where the operations for applying the at least one of the plurality of compatibility functions further comprises: applying a first compatibility function of the plurality of compatibility functions to determine whether the data object is skippable without failing the replication.

In Example 5, the subject matter of Example 4 includes subject matter where the operations for applying the at least one of the plurality of compatibility functions further comprises: applying a second compatibility function of the plurality of compatibility functions to determine whether the data object is replicable by itself without failing the replication.

In Example 6, the subject matter of Examples 3-5 includes subject matter where the operations for applying the at least one of the plurality of compatibility functions further comprises: determining the data object includes no reference outside the shared database associated with the share object.

In Example 7, the subject matter of Example 6 includes subject matter where the operations for applying the at least one of the plurality of compatibility functions further comprise: determining the data object is included in the shared database.

In Example 8, the subject matter of Examples 2-7 includes, the operations further comprising: determining the shared database includes a second plurality of data objects, wherein the second plurality of data objects is non-overlapping with the first plurality of data objects.

In Example 9, the subject matter of Example 8 includes, the operations further comprising: determining the compatibility of each data object of the second plurality of data objects with the replication; and configuring the notification to include the compatibility of each data object of the first plurality of data objects and the compatibility of each data object of the second plurality of data objects.

In Example 10, the subject matter of Example 9 includes, the operations further comprising: performing the replication of the data from the primary deployment account of the data provider to the account of the data consumer when each data object of the first plurality of data objects and each data object of the second plurality of data objects are compatible with the replication.

Example 11 is a method comprising: decoding, by at least one hardware processor, a request for replication of data from a primary deployment account of a data provider to an account of a data consumer; retrieving a share object in response to the request, the share object specifying a first plurality of data objects associated with the data; determining compatibility of each data object of the first plurality of data objects with the replication; and outputting a notification of the compatibility of each data object of the first plurality of data objects to the primary deployment account of the data provider.

In Example 12, the subject matter of Example 11 includes, determining a dependency graph for the first plurality of data objects specified by the share object, the dependency graph including the share object as a top-level object, and a shared database associated with the share object.

In Example 13, the subject matter of Example 12 includes, traversing the dependency graph; and applying at least one of a plurality of compatibility functions to each data object of the first plurality of data objects during the traversing to determine the compatibility of the data object.

In Example 14, the subject matter of Example 13 includes subject matter where the applying of the at least one of the plurality of compatibility functions comprises: applying a first compatibility function of the plurality of compatibility functions to determine whether the data object is skippable without failing the replication.

In Example 15, the subject matter of Example 14 includes subject matter where the applying of the at least one of the plurality of compatibility functions comprises: applying a second compatibility function of the plurality of compatibility functions to determine whether the data object is replicable by itself without failing the replication.

In Example 16, the subject matter of Examples 13-15 includes subject matter where the applying of the at least one of the plurality of compatibility functions comprises: determining the data object includes no reference outside the shared database associated with the share object.

In Example 17, the subject matter of Example 16 includes subject matter where the applying of the at least one of the plurality of compatibility functions comprises: determining the data object is included in the shared database.

In Example 18, the subject matter of Examples 12-17 includes, determining the shared database includes a second plurality of data objects, wherein the second plurality of data objects is non-overlapping with the first plurality of data objects.

In Example 19, the subject matter of Example 18 includes, determining the compatibility of each data object of the second plurality of data objects with the replication; and configuring the notification to include the compatibility of each data object of the first plurality of data objects and the compatibility of each data object of the second plurality of data objects.

In Example 20, the subject matter of Example 19 includes, performing the replication of the data from the primary deployment account of the data provider to the account of the data consumer when each data object of the first plurality of data objects and each data object of the second plurality of data objects are compatible with the replication.

Example 21 is a computer-storage medium comprising instructions that, when executed by one or more processors of a machine, configure the machine to perform operations comprising: decoding a request for replication of data from a primary deployment account of a data provider to an account of a data consumer; retrieving a share object in response to the request, the share object specifying a first plurality of data objects associated with the data; determining compatibility of each data object of the first plurality of data objects with the replication; and outputting a notification of the compatibility of each data object of the first plurality of data objects to the primary deployment account of the data provider.

In Example 22, the subject matter of Example 21 includes, the operations further comprising: determining a dependency graph for the first plurality of data objects specified by the share object, the dependency graph including the share object as a top-level object, and a shared database associated with the share object.

In Example 23, the subject matter of Example 22 includes, the operations further comprising: traversing the dependency graph and applying at least one of a plurality of compatibility functions to each data object of the first plurality of data objects during the traversing to determine the compatibility of the data object.

In Example 24, the subject matter of Example 23 includes subject matter where the operations for applying the at least one of the plurality of compatibility functions further comprises: applying a first compatibility function of the plurality of compatibility functions to determine whether the data object is skippable without failing the replication.

In Example 25, the subject matter of Example 24 includes subject matter where the operations for applying the at least one of the plurality of compatibility functions further comprises: applying a second compatibility function of the plurality of compatibility functions to determine whether the data object is replicable by itself without failing the replication.

In Example 26, the subject matter of Examples 23-25 includes subject matter where the operations for applying the at least one of the plurality of compatibility functions further comprises: determining the data object includes no reference outside the shared database associated with the share object.

In Example 27, the subject matter of Example 26 includes subject matter where the operations for applying the at least one of the plurality of compatibility functions further comprise: determining the data object is included in the shared database.

In Example 28, the subject matter of Examples 22-27 includes, the operations further comprising: determining the shared database includes a second plurality of data objects, wherein the second plurality of data objects is non-overlapping with the first plurality of data objects.

In Example 29, the subject matter of Example 28 includes, the operations further comprising: determining the compatibility of each data object of the second plurality of data objects with the replication; and configuring the notification to include the compatibility of each data object of the first plurality of data objects and the compatibility of each data object of the second plurality of data objects.

In Example 30, the subject matter of Example 29 includes, the operations further comprising: performing the replication of the data from the primary deployment account of the data provider to the account of the data consumer when each data object of the first plurality of data objects and each data object of the second plurality of data objects are compatible with the replication.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   decoding a request for replication of data from a first computing node associated with a primary deployment account of a data provider to a second computing node associated with an account of a data consumer;
   retrieving a share object in response to the request, the share object associated with at least one non-sharable data object in a shared database of the primary deployment account, and the share object specifying a first plurality of sharable data objects associated with the data;

instantiating at least one verification function on a third computing node at least based on generating separate verification processes for views and tables, the at least one verification function to determine compatibility of each data object of the first plurality of sharable data objects and the at least one non-sharable data object with the replication based on dependencies among the first plurality of sharable data objects and further based on parsing the shared database at the primary deployment account during separate verification visits of the first plurality of sharable data objects and the at least one non-sharable data object; and encoding a notification of the compatibility for transmission to the first computing node associated with the primary deployment account of the data provider.

2. The system of claim 1, the operations further comprising:

determining a dependency graph for the first plurality of sharable data objects specified by the share object, the dependency graph including the share object as a top-level object and a shared database associated with the share object.

3. The system of claim 2, the operations further comprising:

traversing the dependency graph; and applying at least one of a plurality of compatibility functions to each data object of the first plurality of sharable data objects during the traversing to determine the compatibility of the data object.

4. The system of claim 3, wherein the operations for applying the at least one of the plurality of compatibility functions further comprises:

applying a first compatibility function of the plurality of compatibility functions to determine whether the data object is skippable without failing the replication.

5. The system of claim 4, wherein the operations for applying the at least one of the plurality of compatibility functions further comprises:

applying a second compatibility function of the plurality of compatibility functions to determine whether the data object is replicable by itself without failing the replication.

6. The system of claim 3, wherein the operations for applying the at least one of the plurality of compatibility functions further comprises:

determining the data object includes no reference outside the shared database associated with the share object.

7. The system of claim 6, wherein the operations for applying the at least one of the plurality of compatibility functions further comprises:

determining the data object is included in the shared database.

8. The system of claim 2, the operations further comprising:

determining the shared database includes a second plurality of data objects, wherein the second plurality of data objects is non-overlapping with the first plurality of sharable data objects.

9. The system of claim 8, the operations further comprising:

determining compatibility of each data object of the second plurality of data objects with the replication; and configuring the notification to include the compatibility of each data object of the first plurality of sharable data objects and the compatibility of each data object of the second plurality of data objects.

10. The system of claim 9, the operations further comprising:

performing the replication of the data from the primary deployment account of the data provider to the account of the data consumer when each data object of the first plurality of sharable data objects and each data object of the second plurality of data objects are compatible with the replication.

11. A method comprising:

decoding, by at least one hardware processor, a request for replication of data from a first computing node associated with a primary deployment account of a data provider to a second computing node associated with an account of a data consumer;

retrieving a share object in response to the request, the share object associated with at least one non-sharable data object in a shared database of the primary deployment account, and the share object specifying a first plurality of sharable data objects associated with the data;

instantiating at least one verification function on a third computing node at least based on generating separate verification processes for views and tables, the at least one verification function to determine compatibility of each data object of the first plurality of sharable data objects and the at least one non-sharable data object with the replication based on dependencies among the first plurality of sharable data objects and further based on parsing the shared database at the primary deployment account during separate verification visits of the first plurality of sharable data objects and the at least one non-sharable data object; and encoding a notification of the compatibility for transmission to the first computing node associated with the primary deployment account of the data provider.

12. The method of claim 11, further comprising:

determining a dependency graph for the first plurality of sharable data objects specified by the share object, the dependency graph including the share object as a top-level object and a shared database associated with the share object.

13. The method of claim 12, further comprising:

traversing the dependency graph; and applying at least one of a plurality of compatibility functions to each data object of the first plurality of sharable data objects during the traversing to determine the compatibility of the data object.

14. The method of claim 13, wherein the applying of the at least one of the plurality of compatibility functions comprises:

applying a first compatibility function of the plurality of compatibility functions to determine whether the data object is skippable without failing the replication.

15. The method of claim 14, wherein the applying of the at least one of the plurality of compatibility functions comprises:

applying a second compatibility function of the plurality of compatibility functions to determine whether the data object is replicable by itself without failing the replication.

16. The method of claim 13, wherein the applying of the at least one of the plurality of compatibility functions comprises:

determining the data object includes no reference outside the shared database associated with the share object.

17. The method of claim 16, wherein the applying of the at least one of the plurality of compatibility functions comprises:
determining the data object is included in the shared database.

18. The method of claim 12, further comprising:
determining the shared database includes a second plurality of data objects, wherein the second plurality of data objects is non-overlapping with the first plurality of sharable data objects.

19. The method of claim 18, further comprising:
determining compatibility of each data object of the second plurality of data objects with the replication; and
configuring the notification to include the compatibility of each data object of the first plurality of sharable data objects and the compatibility of each data object of the second plurality of data objects.

20. The method of claim 19, further comprising:
performing the replication of the data from the primary deployment account of the data provider to the account of the data consumer when each data object of the first plurality of sharable data objects and each data object of the second plurality of data objects are compatible with the replication.

21. A computer-storage medium comprising instructions that, when executed by one or more processors of a machine, configure the machine to perform operations comprising:
decoding a request for replication of data from a first computing node associated with a primary deployment account of a data provider to a second computing node associated with an account of a data consumer;
retrieving a share object in response to the request, the share object associated with at least one non-sharable data object in a shared database of the primary deployment account, and the share object specifying a first plurality of sharable data objects associated with the data;
instantiating at least one verification function on a third computing node at least based on generating separate verification processes for views and tables, the at least one verification function to determine compatibility of each data object of the first plurality of sharable data objects and the at least one non-sharable data object with the replication based on dependencies among the first plurality of sharable data objects and further based on parsing the shared database at the primary deployment account during separate verification visits of the first plurality of sharable data objects and the at least one non-sharable data object; and
encoding a notification of the compatibility for transmission to the first computing node associated with the primary deployment account of the data provider.

22. The computer-storage medium of claim 21, the operations further comprising:
determining a dependency graph for the first plurality of sharable data objects specified by the share object, the dependency graph including the share object as a top-level object and a shared database associated with the share object.

23. The computer-storage medium of claim 22, the operations further comprising:
traversing the dependency graph; and
applying at least one of a plurality of compatibility functions to each data object of the first plurality of sharable data objects during the traversing to determine the compatibility of the data object.

24. The computer-storage medium of claim 23, wherein the operations for applying the at least one of the plurality of compatibility functions further comprises:
applying a first compatibility function of the plurality of compatibility functions to determine whether the data object is skippable without failing the replication.

25. The computer-storage medium of claim 24, wherein the operations for applying the at least one of the plurality of compatibility functions further comprises:
applying a second compatibility function of the plurality of compatibility functions to determine whether the data object is replicable by itself without failing the replication.

26. The computer-storage medium of claim 23, wherein the operations for applying the at least one of the plurality of compatibility functions further comprises:
determining the data object includes no reference outside the shared database associated with the share object.

27. The computer-storage medium of claim 26, wherein the operations for applying the at least one of the plurality of compatibility functions further comprises:
determining the data object is included in the shared database.

28. The computer-storage medium of claim 22, the operations further comprising:
determining the shared database includes a second plurality of data objects, wherein the second plurality of data objects is non-overlapping with the first plurality of sharable data objects.

29. The computer-storage medium of claim 28, the operations further comprising:
determining compatibility of each data object of the second plurality of data objects with the replication; and
configuring the notification to include the compatibility of each data object of the first plurality of sharable data objects and the compatibility of each data object of the second plurality of data objects.

30. The computer-storage medium of claim 29, the operations further comprising:
performing the replication of the data from the primary deployment account of the data provider to the account of the data consumer when each data object of the first plurality of sharable data objects and each data object of the second plurality of data objects are compatible with the replication.

* * * * *